United States Patent [19]

Sirai et al.

[11] Patent Number: 4,910,616
[45] Date of Patent: Mar. 20, 1990

[54] SERVO TRACK CENTERING FOR MAGNETIC DISC READ/WRITE HEAD

[75] Inventors: Mituru Sirai; Masaru Koyama; Takaharu Sota, all of Amagasaki, Japan

[73] Assignee: Mitsubishi Denki Kabushiki Kaisha, Tokyo, Japan

[21] Appl. No.: 168,011

[22] Filed: Mar. 14, 1988

[30] Foreign Application Priority Data

Mar. 13, 1987 [JP] Japan ................................. 62-56690

[51] Int. Cl.[4] ...................... G11B 5/596; G11B 21/10
[52] U.S. Cl. ............................. 360/77.08; 360/77.02
[58] Field of Search ................. 360/51, 61, 62, 73.03, 360/77.02, 77.05, 77.07, 77.08, 78.04; 369/32, 33, 41; 358/907

[56] References Cited

U.S. PATENT DOCUMENTS

Re. 32,075  1/1986  Harrison et al. ................. 360/77.08
4,419,701  12/1983  Harrison et al. ................. 360/77.02

Primary Examiner—Alan Faber
Assistant Examiner—Steven R. Garland
Attorney, Agent, or Firm—Sughrue, Mion, Zinn, Macpeak & Seas

[57] ABSTRACT

A magnetic storage disc 1 has a plurality of concentric data tracks, with circumferentially staggered servo centering signals B, C recorded flanking each track in a sector shaped region of the disc. A rotationally driven spindle 2 positionally clamps the disc such that an index mark on the spindle base is sensed by a pickup 5 immediately following the servo sector. The pickup signal is reliably supplied to a host computer via a timer 16, a microprocessor 12 and a R/W interface 15 to enable read/write operations on an accessed track. A delayed output from the timer, at the end of the data portion of the track and at the beginning of the servo sector, terminates such operations, enables the R/W head 3 to be stepped to a next addressed track by an actuator 4 with coarse positioning, and initiates the accurate centering of the head by an open loop servo.

3 Claims, 2 Drawing Sheets

SERVO TRACK CENTERING FOR MAGNETIC DISC READ/WRITE HEAD

BACKGROUND OF THE INVENTION

This invention relates to a servo arrangement for the fine positioning of a read/write (R/W) head over the center of a data track in a magnetic disc storage system.

In such a system one or more magnetic storage discs are driven at a constant rotational speed on the order of 3,000 rpm, and each disc carries a plurality of circular, concentrically disposed data tracks spaced radially outwardly from the center of the disc. One or more R/W heads are associate with each disc, and are slidably mounted on a carriage such that they are disposed in close proximity to the disc surface. The heads are radially and very rapidly, i.e. substantially instantaneously, driven by an actuator to step them between the different data tracks, i.e. to radially jump from a present track to an addressed track in a step-like manner. The actuator and its control circuitry are preprogrammed to implement the coarse positioning of the head over the center of the addressed data track during each jump.

A conventional system for implementing the fine or more accurate centering positioning of the head(s) following each track jump is schematically shown in FIG. 1, and some of the signals generated thereby are illustrated in FIG. 2. This system generally corresponds to that described in greater detail in U.S. Pat. No. Re. 32,075.

Referring to FIG. 1, a plurality of magnetic storage discs 1 are clamped to a rotationally driven spindle 2, and each disc is associated with upper and lower R/W heads 3 radially stepped by an actuator 4 to access an addressed data track with coarse centering positioning. A data masked, sector shaped region occupying perhaps 10°–15° of the disc circumference is provided on each disc surface, and servo control signals to implement the fine centering positioning of the head are recorded in this sector region. The servo signals flank each data track and are circumferentially staggered or spaced such that the R/W head reads or "sees" them in quick succession.

Referring additionally to the signal diagrams shown in FIG. 2, the discs are positionally clamped to the spindles such that at the time instant when a head 3 is radially jumped by the actuator 4 from data track DT1 to DT2, for example, in response to a command signal originating in a host computer (not shown), a pickup 5 senses an index mark on the outer periphery of the spindle base and generates an index signal as shown at A in FIG. 2. The index signal is fed to a sampling counter 6 and to a servo controlling microprocessor 12. In response to the receipt of the index signal the counter 6 generates a servo period gate signal D which is applied to a sample and hold circuit 9 as an enabling signal. At he same time, the R/W head 3 (referred to in the singular for simplicity) reads the servo signals B and C flanking track DT2 in succession, and the head output is applied to the sample and hold circuit via amplifier 7 and peak detector 8. Assuming that the head is not precisely centered over the accessed data track DT2, the sampled signals resulting from the servo recordings B, C separately held in circuit 9 will have unequal amplitudes as shown at E1 and E2 in FIG. 2. These signals are applied to a differential comparator 10 whose output, representing the amplitude difference between them and thus the off-center degree or error distance of the head 3, is converted to digital form in an A/D circuit 11 and applied to the microprocessor. The polarity of the comparator output indicates the direction of the required centering correction in the usual manner. The microprocessor then generates a digital correction signal which is converted to analog form in circuit 13 and applied to a driver 14 to appropriately control the actuator 4 in a servo loop manner to accurately center the head 3 over track DT2. Such centering correction is accomplished in the very short time interval between the trailing edge of the second servo signal E2 and the rise of the gate signal D.

Of course, if the E1 and E2 signals generated by the head 3 are equal in amplitude, then the head is already precisely centered and no fin adjustment is necessary.

When the index signal or pulse of waveform A generated by pickup 5 is applied to the microprocessor 12 at the beginning of each data track cycle a software sequence is initiated in the microprocessor which generates the pulse signal shown in waveform F at the end of the servo correction. This pulse signal is delivered to the host computer via an R/W interface 15 as an R/W enable signal. In so many words, it tells the host computer that the servo correction of the head position has been completed such that read/write operations may now be commenced on data track DT2.

A recurrent problem with this prior art arrangement is that the generation of the servo period completion pulse signal F by the mentioned software sequence in the microprocessor is generally unreliable. Thus, such pulse signal often fails to appear at its specified or programmed time, which either delays the read/write sequence on the accessed data track during a given rotational cycle, which of course can result in data loss or the lack of full data recovery, or which requires the "wasting" of a full rotational cycle before the instructed read/write sequence can be initiated.

SUMMARY OF THE INVENTION

This invention overcomes the above problem to thus enhance the reliability of the system and avoid potential delays by positively orienting the disc(s) in the spindle such that the index mark, and attendantly the pickup signal derived therefrom, occurs at the trailing edge of the sector shaped region in the direction of revolution of the spindle and clamped disc(s). The pickup output is fed to a timer, whose output in turn immediately and reliably enables or triggers the host computer to commence read/write operations on the accessed data track, since at this time the head has already been accurately centered. The timer then times or measures the duration of the read/write operations, which corresponds to a full revolution time minus the servo sector traversal time, and at the end of such period disables the data operations and enables the servo loop to center the head on the next accessed disc track. The generation of the trigger pulse F by the mentioned software sequence in the microprocessor is thus fully avoided.

DETAILED DESCRIPTION OF THE PREFERRED EMBODIMENT

Figure 1:
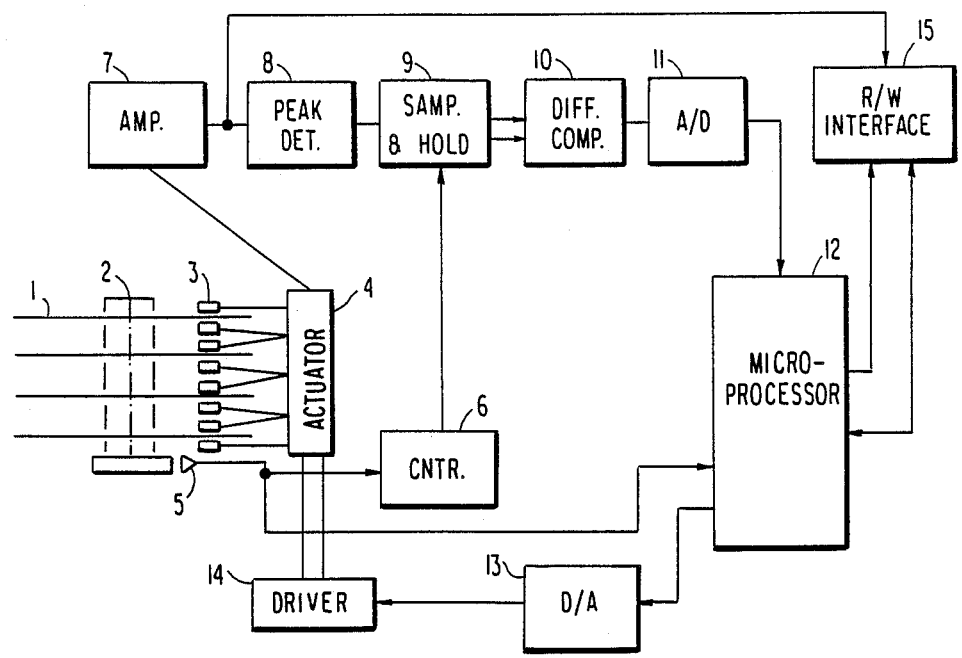
FIG. 1 shows a schematic block diagram of a prior art servo centering system for an R/W head in a magnetic disc storage system.
Figure 2:
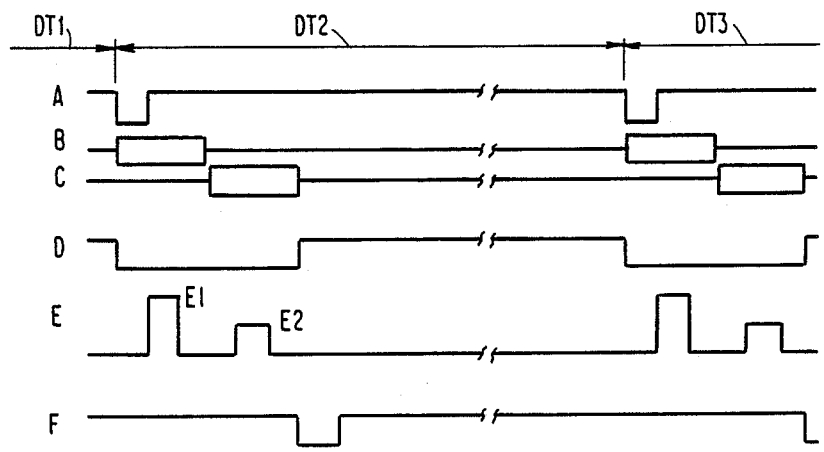
FIG. 2 shows signal waveforms generated during the operation of the circuitry of FIG. 1.
Figure 3:
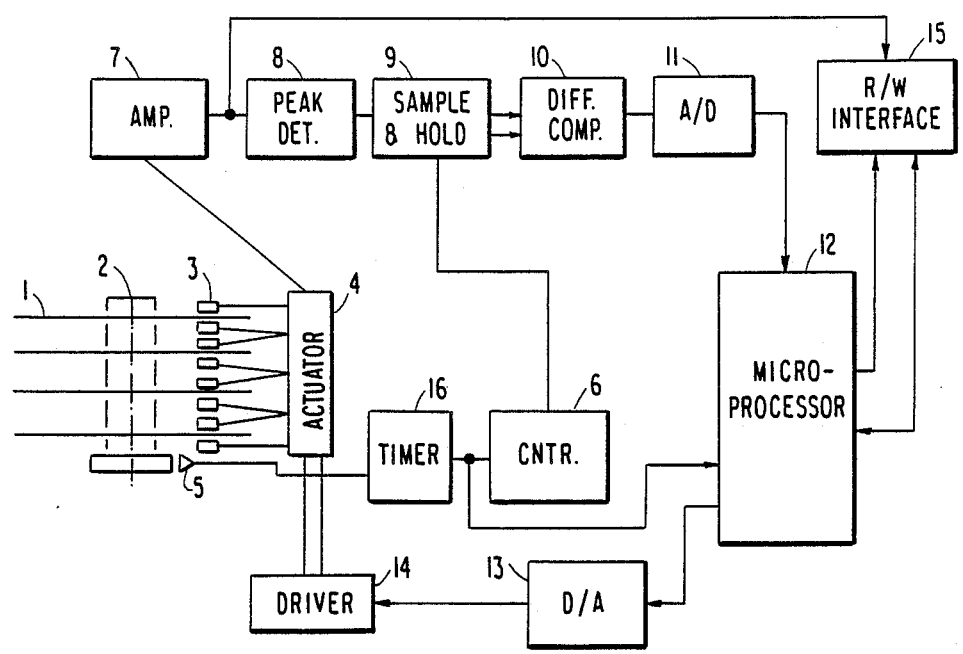
FIG. 3 shows a block diagram of a servo centering system in accordance with the invention.
Figure 4:
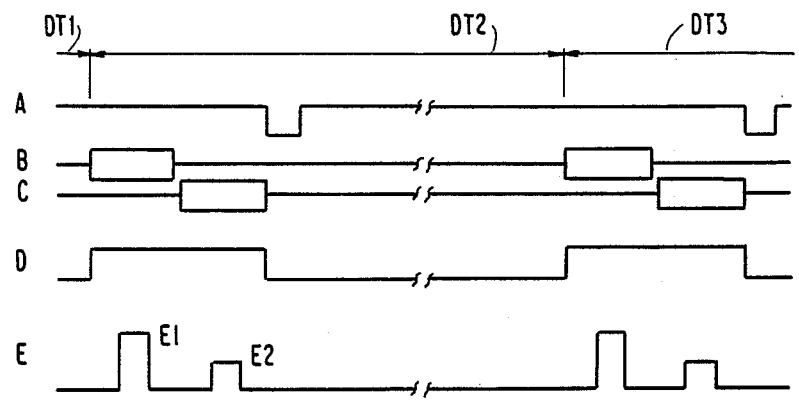
FIG. 4 shows signal waveforms generated during the operation of the circuitry of FIG. 3.

Referring to FIGS. 3 and 4, wherein the same components and waveforms as shown in FIGS. 1 and 2 are designated by like reference numerals and symbols, it will be seen from FIG. 4 that the rotation index signal A is now generated by the pickup 5 at the end of each servo correction period or sector rather than at the beginning thereof as in FIG. 2. This timing change may be implemented by appropriately moving the index mark on the periphery of the spindle base, or by simply unclamping the discs 1 from the spindle 2, rotating the discs through the appropriate arc or number of degrees, and then re-clamping them to the spindle.

Referring to FIG. 3, it will be noted that a timer 16 is now interposed between the pickup 5 and the sampling counter 6, with the timer output also being supplied to the microprocessor 12. With this arrangement the index signal A generated by the pickup 5 at the end of the servo correction period is applied to the timer 16. The timer output, as represented by waveform D in FIG. 4, is immediately supplied to the host computer via the microprocessor 12 and the R/W interface 15 as an enabling signal to thus inform the computer that the servo correction period has ended and that read/write operations on data track DT2, for example, may now be commenced. When the end of the data portion of track DT2 is reached the timer output D rises, which initiates the sampling counter 6 whose output gates or enables the sample and hold circuit 9 as before, and which informs the host computer, again via the microprocessor and the R/W interface, that the end of the data track has been reached and that the read/write operations thereon must thus be terminated. At this same time the head 3 is stepped by the actuator 4 to the next data track DT3 at the beginning of the servo control sector, and the fine centering positioning of the head 3 for track DT3 proceeds as described above in connection with FIGS. 1 and 2.

Thus, and in accordance with the invention, each rotational index signal or pulse A, whose generation is implemented by hardware rather than software and is thus fully reliable, serves as an immediate read/write enable or trigger signal to the host computer via the timer 16, the microprocessor and the R/W interface, and the timer output subsequently disables the data operations at the end of the data track and simultaneously enables the servo loop centering of the head on the next accessed data track. The unreliable trigger pulse F of the prior art is thus fully eliminated and replaced by the more reliable pickup index signal fed through the timer, which attendantly simplifies the operational sequences performed by the microprocessor.

Although a separate timer component 16 has been described, its measurements may instead be directly implemented by circuitry within the microprocessor as will be apparent to those skilled in the art. Furthermore, the index mark may be recorded on the disc at tee trailing edge of the servo sector and detected by the head 3 instead of using a separate pickup 5 for this purpose.

What is claimed is:

1. An arrangement for accurately centering a read-write head (3) over a data track in a magnetic disc storage system, comprising:
   (a) a magnetic storage disc (1) having a plurality of concentric data tracks on a surface thereof, and a sector shaped region defined on said disc surface and carrying recordings of circumferentially spaced servo centering signals (B, C) flanking each track,
   (b) a rotatably driven spindle (2) clamping the disc for rotation therewith,
   (c) actuator means (4, 14) for radially stepping the head to an addressed data track with coarse centering when the head is at a leading edge of the sector shaped region,
   (d) means for deriving an index signal at a trailing edge of the sector shaped region during each revolution of the disc and spindle,
   (e) open loop servo means for accurately centering the head on an accessed data track at the trailing edge of the sector shaped region in response to output signals from the head derived from the servo centering signals, and
   (f) timing means responsive to the index signal for:
      (1) immediately enabling data signal read/write operations on a presently accessed data track,
      (2) subsequently disabling said data signal read/write operations at a leading edge of the sector shaped region, and
      (3) simultaneously with said disabling, enabling the servo means to accurately center the head on a next accessed data track.

2. An arrangement according to claim 1, wherein the deriving means comprises an index mark defined on a periphery of the spindle at a position corresponding to the trailing edge of the sector shaped region, and a pickup (5) disposed proximate the spindle periphery for sensing the index mark.

3. An arrangement according to claim 2, wherein the timing means comprises a timer (16) having an input connected to an output of the pickup, a first output connected to the servo means, and a second output transmitting enabling and disabling signals for the data signal read/write operations.

* * * * *